US011404705B2

United States Patent
Kim et al.

(10) Patent No.: US 11,404,705 B2
(45) Date of Patent: Aug. 2, 2022

(54) BIPOLAR PLATE OF POLYMER ELECTROLYTE MEMBRANE FUEL CELL

(71) Applicant: SEOUL NATIONAL UNIVERSITY R&DB FOUNDATION, Seoul (KR)

(72) Inventors: Min Soo Kim, Seoul (KR); Sung Hoon Choi, Seoul (KR); Dong Gyun Kang, Seoul (KR); In Seop Lim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 168 days.

(21) Appl. No.: 16/992,128

(22) Filed: Aug. 13, 2020

(65) Prior Publication Data

US 2022/0052356 A1    Feb. 17, 2022

(51) Int. Cl.
*H01M 8/0265* (2016.01)
*H01M 8/1007* (2016.01)
*H01M 8/10* (2016.01)

(52) U.S. Cl.
CPC ....... *H01M 8/0265* (2013.01); *H01M 8/1007* (2016.02); *H01M 2008/1095* (2013.01)

(58) Field of Classification Search
None
See application file for complete search history.

(56) References Cited

U.S. PATENT DOCUMENTS

| 2015/0180052 | A1* | 6/2015 | Leger | H01M 8/10 429/479 |
| 2018/0175405 | A1* | 6/2018 | Jo | H01M 8/0258 |

FOREIGN PATENT DOCUMENTS

| JP | 2012-248460 | * 12/2012 | ............. H01M 8/02 |
| KR | 10-2008-0073644 A | 8/2008 | |
| KR | 10-2017-0050689 A | 5/2017 | |
| KR | 10-1836648 B1 | 3/2018 | |

* cited by examiner

*Primary Examiner* — Helen Oi K Conley
(74) *Attorney, Agent, or Firm* — Revolution IP, PLLC

(57) ABSTRACT

A plurality of channel elements provided in a bipolar plate have different widths depending on positions, so that the velocity of flow of the fluid increases from an inlet toward an outlet of the bipolar plate and water generated when the fluid is condensed on the downstream side of the bipolar plate can be discharged more smoothly. In addition, a plurality of channel elements have different contact angles depending on positions of the plurality of channel elements so that the contact angle increases toward the outlet side of the bipolar plate. Thus, the reaction gas can be more concentrated on the surface of a gas diffusion layer. Even if the concentration of the reaction gas is reduced at the outlet side of the bipolar plate, the diffusion of the reaction gas is well performed, so that performance reduction can be prevented.

13 Claims, 7 Drawing Sheets

BIPOLAR PLATE OF POLYMER ELECTROLYTE MEMBRANE FUEL CELL

BACKGROUND OF THE INVENTION

1. Field of the Invention

The present invention relates to a bipolar plate of a polymer electrolyte membrane fuel cell, and more particularly, to a bipolar plate of a polymer electrolyte membrane fuel cell in which a width and a contact angle of each of a plurality of channel elements are differently formed according to positions of the plurality of channel elements so that performance reduction can be prevented even at a rear end of a fuel cell.

2. Description of the Related Art

In general, fuel cells are power generation devices in which chemical energy generated by oxidation of a fuel is directly converted into electrical energy. These fuel cells are classified into solid oxide fuel cells, molten carbonate fuel cells, and polymer electrolyte membrane fuel cells (PEMFCs) depending on the type of electrolyte.

The polymer electrolyte membrane fuel cells (PEMFCs) are fuel cells in which a polymer capable of transmitting hydrogen ions are used as an electrolyte membrane. A PEMFC stack includes a membrane-electrode assembly (MEA) having an electrode layer provided with an anode and a cathode around the electrolyte membrane, and a gas diffusion layer (GDL) that evenly distributes reaction gases, and a bipolar plate that supplies the reaction gases to the GDL and discharges generated water.

Bipolar plates according to the related art are configured such that the flow of the reaction gases and the water flows through a two-dimensional flow path. However, the bipolar plates according to the related art do not reflect the flow characteristics of reactants and products that change from an inlet region to an outlet region, thus limiting the improvement of output of the fuel cell.

SUMMARY OF THE INVENTION

The present invention provides a bipolar plate of a polymer electrolyte membrane fuel cell in which design parameters of channel elements are changed by considering flow characteristics that change from an inlet and an outlet of the bipolar plate so that performance can be secured.

According to an aspect of the present invention, there is provided a bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, the bipolar plate including a plurality of channel elements that protrude from a surface of a base to be inclined at a certain contact angle, in which front and rear surfaces of each channel element are opened so that a channel flow path through which the fluid passes, are formed, wherein, among the plurality of channel elements, the channel elements arranged in an area close to the bipolar plate outlet have a smaller cross-sectional area than the channel elements arranged in an area close to the bipolar plate inlet, and the contact angle is formed large.

The base may include a gas diffusion layer.

According to another aspect of the present invention, there is provided a bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, wherein the bipolar plate inlet and the bipolar plate outlet are apart from each other in a diagonal direction, the bipolar plate including a plurality of channel elements arranged in a form of a matrix to be apart from each other by a certain distance on a surface of a base, wherein each of the plurality of channel elements protrudes from the surface of the base to be inclined at a certain contact angle, in which front and rear surfaces of each channel element are opened so that a channel flow path through which the fluid passes, are formed, and among the plurality of channel elements, the channel elements arranged in an area close to the bipolar plate outlet have a smaller cross-sectional area than the channel elements arranged in an area close to the bipolar plate inlet, and the contact angle is formed large, and the plurality of channel elements have a same length, and among the plurality of channel elements, the channel elements apart from each other in a width direction of the channel flow path and arranged in a same row have the width decreasing as they go toward a direction to the bipolar plate outlet, and the contact angle thereof is formed identically, and among the plurality of channel elements, the channel elements apart from each other in a longitudinal direction of the channel flow path and arranged in a same column have a same width as they go toward a direction to the bipolar plate outlet, and the contact angle thereof is formed to increase.

The plurality of channel elements may have different widths, and the widths may be gradually smaller as they are arranged in an area close to the bipolar plate outlet.

The plurality of channel elements may have different contact angles, and the contact angles may be gradually larger as they are arranged in an area close to the bipolar plate outlet.

The channel elements may be arranged in such a way that at least a portion of a channel outlet of one of the channel elements and a channel inlet of the other channel element of two channel elements adjacent in a longitudinal direction of the channel flow path overlap each other.

According to another aspect of the present invention, there is provided a bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, wherein the bipolar plate inlet and the bipolar plate outlet are apart from each other in a diagonal direction, the bipolar plate including a plurality of channel elements arranged in a form of a matrix to be apart from each other on a surface of a base, wherein each of the plurality of channel elements protrudes from the surface of the base to be inclined at a certain contact angle, in which front and rear surfaces of each channel element are opened so that a channel flow path through which the fluid passes, are formed, and among the plurality of channel elements, the channel elements arranged in an area close to the bipolar plate outlet have a smaller cross-sectional area than the channel elements arranged in an area close to the bipolar plate inlet, and the contact angle is formed large, and the width and the contact angle change independently of each other, the plurality of channel elements have a same length, and among the plurality of channel elements, a portion of the channel elements adjacent in a width direction of the channel element have a same cross-sectional area, and a portion of the channel elements adjacent in a longitudinal direction of the channel element have a same contact angle.

The channel elements may be arranged in such a way that at least a portion of a channel outlet of one of the channel elements and a channel inlet of the other channel element of two channel elements adjacent in a longitudinal direction of the channel flow path overlap each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described as below with reference to the attached drawings.

Figure 1:
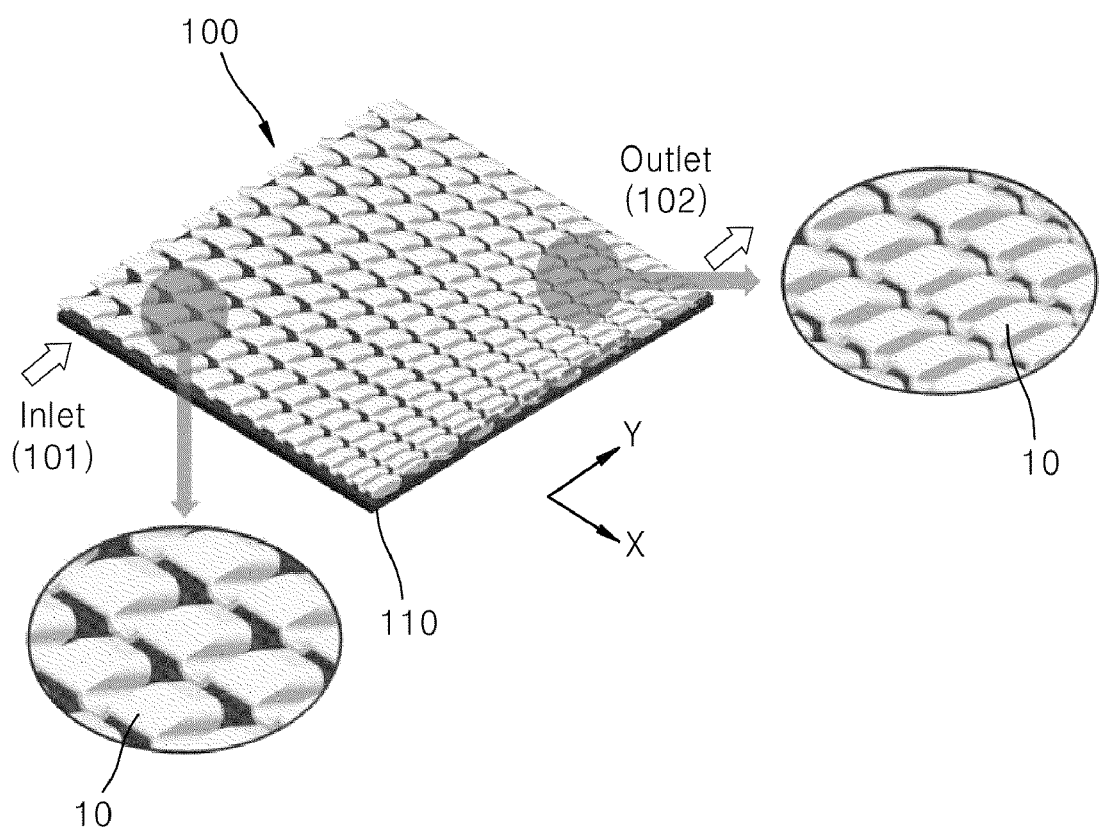
FIG. 1 is a perspective view illustrating a bipolar plate of a polymer electrolyte membrane fuel cell according to an embodiment of the present invention.
Figure 2:
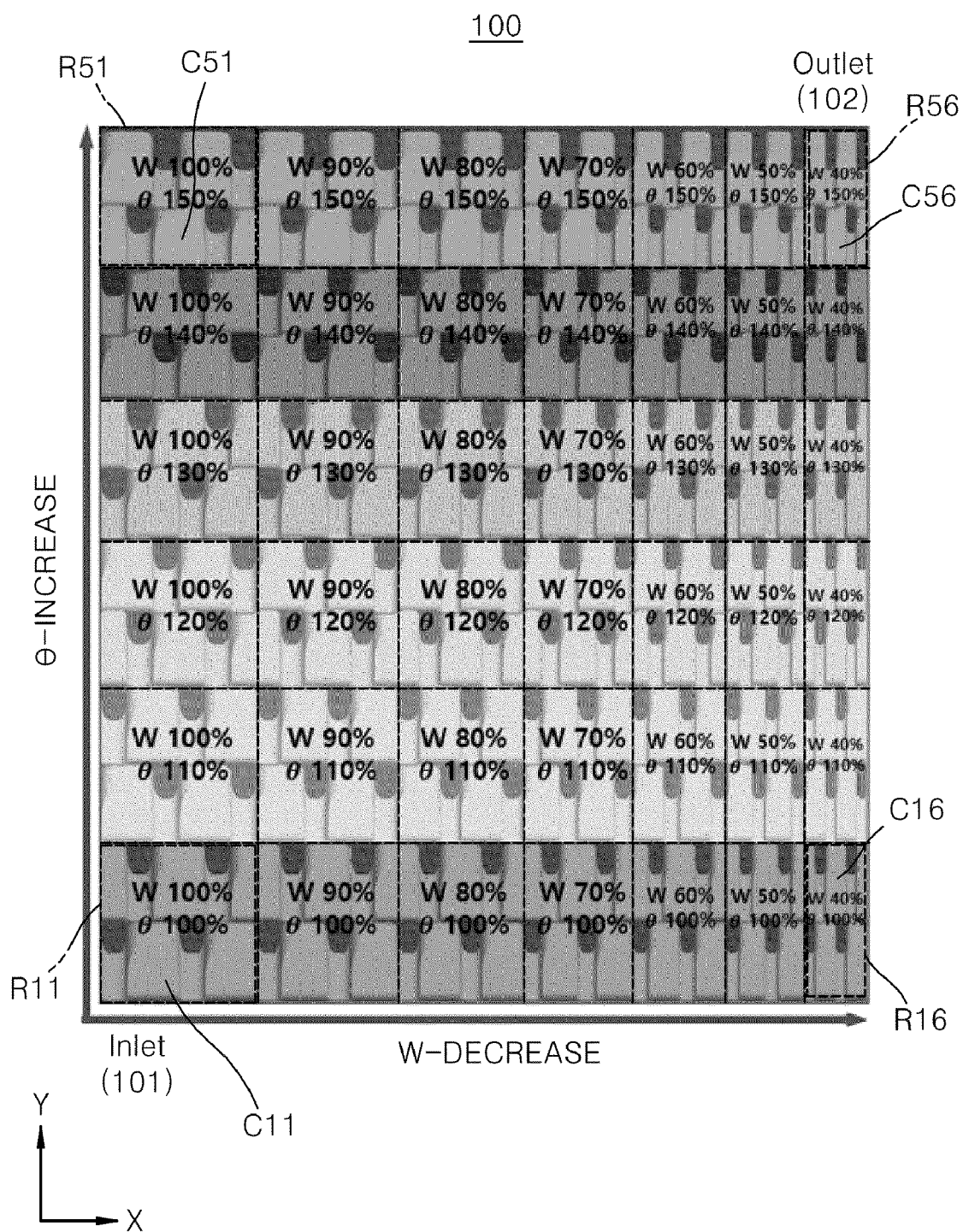
FIG. 2 schematically illustrates changes in a width and a contact angle of channel elements depending on regions in the bipolar plate of the polymer electrolyte membrane fuel cell according to an embodiment of the present invention.
Figure 3:
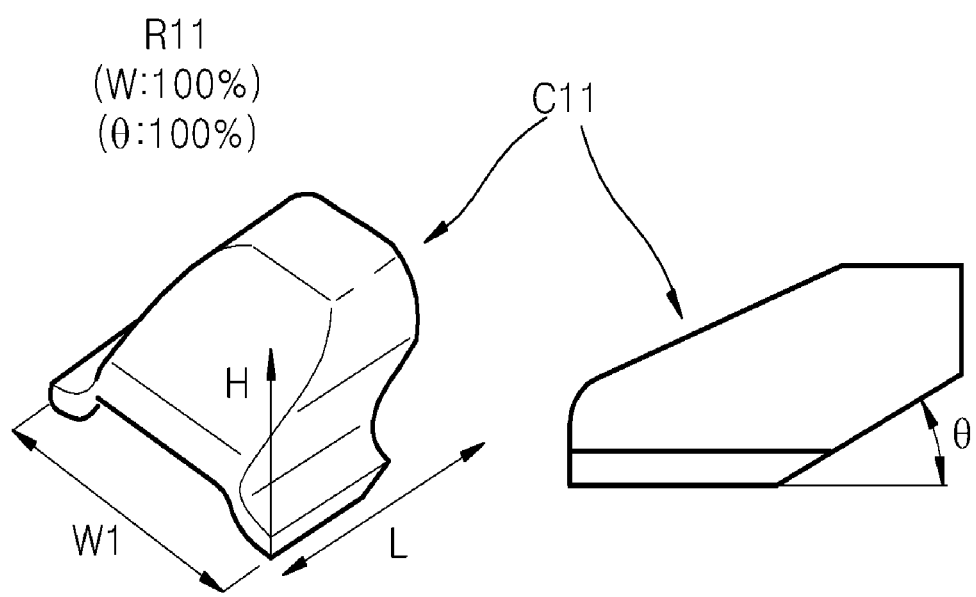
FIG. 3 illustrates a width and a contact angle of channel elements belonging to an $11^{th}$ region shown in FIG. 2.
Figure 4:
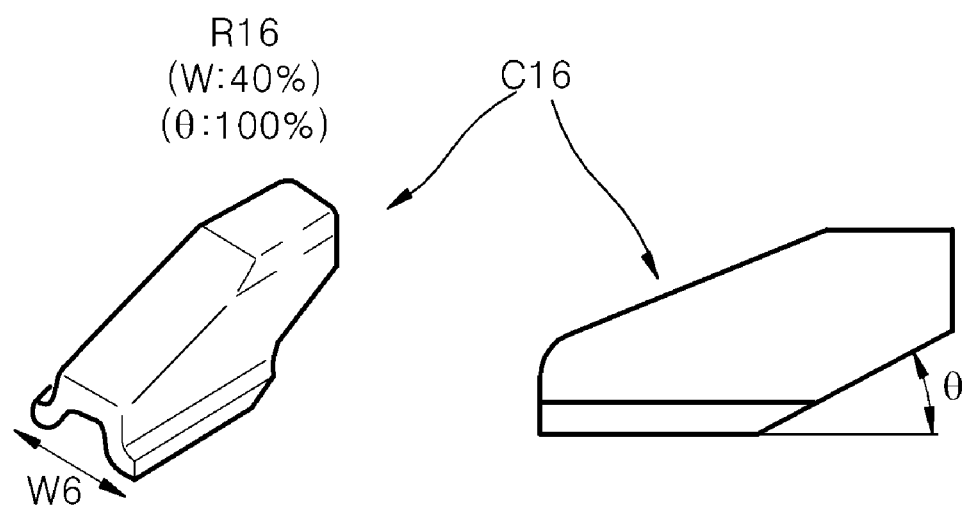
FIG. 4 illustrates a width and a contact angle of channel elements belonging to a $16^{th}$ region shown in FIG. 2.
Figure 5:
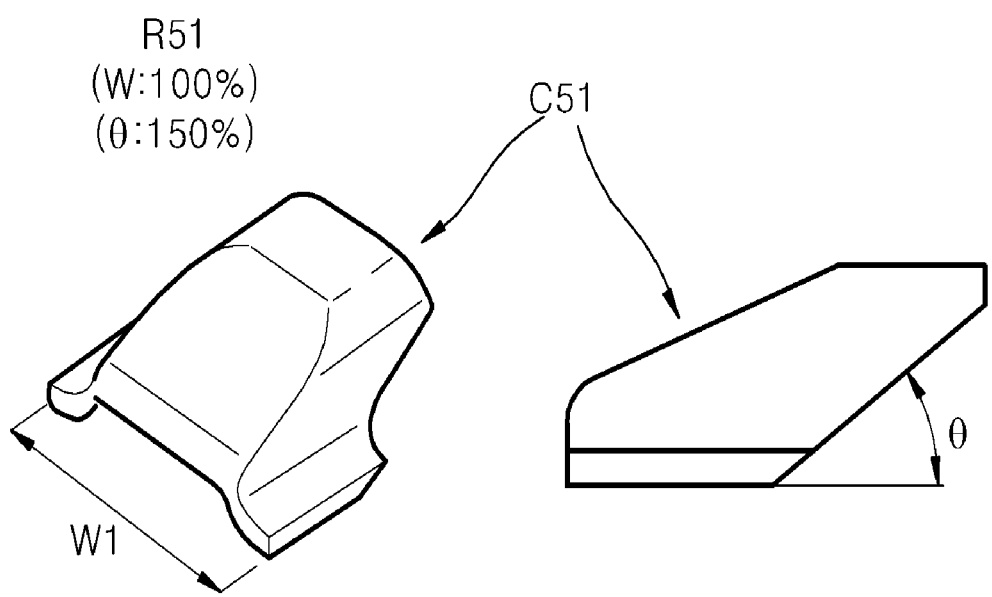
FIG. 5 illustrates a width and a contact angle of channel elements belonging to a $51^{st}$ region shown in FIG. 2.
Figure 6:
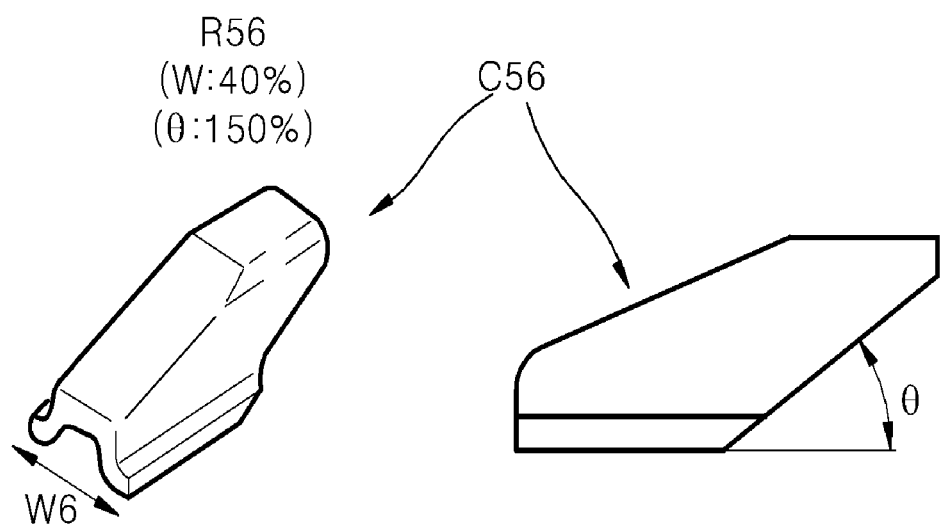
FIG. 6 illustrates a width and a contact angle of channel elements belonging to a $56^{th}$ region shown in FIG. 2.

FIG. 1 is a perspective view illustrating a bipolar plate of a polymer electrolyte membrane fuel cell according to an embodiment of the present invention. FIG. 2 schematically illustrates changes in a width and a contact angle of channel elements depending on regions in the bipolar plate of the polymer electrolyte membrane fuel cell according to an embodiment of the present invention.

Referring to FIGS. 1 and 2, a bipolar plate 100 of a polymer electrolyte membrane fuel cell according to an embodiment of the present invention is a panel in which a bipolar plate inlet 101 into which a reaction gas is introduced from the outside and a bipolar plate outlet 102 from which a fluid including the reaction gas remaining after reacting inside or a product generated after reaction is discharged to the outside, are formed to deliver the reaction gas introduced from the bipolar plate inlet 101 to a gas diffusion layer (not shown) of the fuel cell.

Here, the reaction gas includes fuel or gas, and the product includes water. Hereinafter, both the reaction gas and the product will be referred to as a fluid.

The bipolar plate inlet 101 and the bipolar plate outlet 102 may be provided in positions in which they are apart from each other in a diagonal direction from the bipolar plate 100, so that the flow path of the fluid is at its maximum.

The bipolar plate 100 includes a plurality of channel elements 10 so as to form the flow path of the fluid.

The plurality of channel elements 10 are apart from each other by a certain distance on the surface of a base 110 and are arranged in the form of a matrix. Here, the base 110 will be described as the gas diffusion layer (not shown) but the present invention is not limited thereto, and the base 110 may also be a panel separately provided to be in contact with the gas diffusion layer (not shown).

Each of the channel elements 10 may protrude from the surface of the base 110 to be inclined at a certain contact angle θ, and front and rear surfaces of each channel element 10 may be opened so that a channel flow path 10a through which the fluid may pass, may be formed.

The opened front surface of the channel element 10 may constitute a channel inlet 10b, and the opened rear surface of the channel element 10 may constitute a channel outlet 10c.

The channel elements 10 are arranged in such a way that at least a portion of a channel outlet of one of the channel elements and a channel inlet of the other channel element of two channel elements adjacent in a longitudinal direction Y of the channel flow path 10a overlap each other.

The plurality of channel elements 10 are formed with different design parameters depending on the position in the bipolar plate 100.

The design parameters are parameters set to change the velocity of flow and flow direction of the fluid passing through the channel flow path 10a, and include the cross-sectional area of the channel flow path 10a and a contact angle θ of the channel flow path 10a. Hereinafter, in the present embodiment, lengths L of the channel elements 10 are formed identically, and only widths W of the channel elements 10 are changed so as to change the cross-sectional area of the channel flow path 10a. For example, the design parameters will be described as the width W of the channel elements 10 instead of the cross-sectional area.

Thus, in the plurality of channel elements 10, the width W and the contact angle θ of the channel elements 10 are differently formed from the bipolar plate inlet 101 toward the bipolar plate outlet 102.

In the plurality of channel elements 10, the channel elements 10 arranged in an area close to the bipolar plate outlet 102 have a smaller width W than the channel elements 10 arranged in an area close to the bipolar plate inlet 101, and the contact angle θ of the channel elements 10 is formed large.

Referring to FIG. 2, the bipolar plate 100 is divided into 30 virtual flow regions R11 to R56 to describe changes in design parameters depending on the flow regions, for example.

In the present embodiment, the virtual flow regions R11 to R56 are divided into 30, for example, but the present invention is not limited thereto, and the number or size of the flow regions may be differently applied according to the flow characteristics of the fluid.

The design parameters of the channel elements 10 are set differently according to the flow regions R11 to R56, for example. That is, the design parameters of the channel elements 10 belonging to the same flow region are the same, and the design parameters of the channel elements 10 belonging to different flow regions are set differently.

In addition, the design parameters of the channel elements 10 change independently of each other. The channel elements 10 located in the same row or column change only one of the width W and the contact angle θ.

That is, among the plurality of channel elements 10, the channel elements 10 apart from each other in the width direction X of the channel flow path 10a and arranged in the same row have the width W decreasing as they go toward the direction to the bipolar plate outlet 102, but the contact angle θ of the channel elements 10 is formed identically.

Further, among the plurality of channel elements 10, the channel elements 10 apart from each other in the longitudinal direction Y of the channel flow path 10a and arranged in the same column have the same width W as they go toward the direction to the bipolar plate outlet 102, but the contact angle θ of the channel elements 10 are formed to increase.

Referring to FIGS. 2 through 6, changes in design parameters according to the positions of the channel elements 10 will be described as follows.

Hereinafter, the width W of $11^{th}$ channel elements C11 belonging to an $11^{th}$ region R11 is 100%, and the contact angle θ of the $11^{th}$ channel elements C11 is 100%, for example, based on the channel elements belonging to the $11^{th}$ region R11 closest to the bipolar plate inlet 101.

The width W decreases by 10% from the $11^{th}$ region R11 to a $16^{th}$ region R16 close to the bipolar plate outlet 102 along the width direction X of the channel flow path 10a, but the contact angle θ remains the same. The reduction ratio of the width W is 10%, for example, but is not limited thereto, and can be adjusted according to the flow characteristics of the fluid.

That is, the width W of the $16^{th}$ channel elements C16 in the $16^{th}$ region R16 closest to the bipolar plate outlet 102 decreases up to 40%, although they are located in the same row as the $11^{th}$ region R11, and the contact angle θ remains the same at 100%.

On the other hand, the width W is the same as the direction from the $11^{th}$ region R11 toward a $51^{st}$ region R51 close to the bipolar plate outlet 102 along the longitudinal direction Y of the channel flow path 10a, but only the contact angle θ increases by 10%. The increase ratio of the contact angle θ is 10%, for example, but is not limited thereto, and can be adjusted according to the flow characteristics of the fluid.

That is, the width W of the $51^{st}$ channel elements C51 in the $51^{st}$ region R51 closest to the bipolar plate outlet 102 is maintained at 100%, although they are located in the same column as the $11^{th}$ region R11. However, the contact angle θ increases up to 150%.

In addition, the width W of $56^{th}$ channel elements C56 in a $56^{th}$ region R56 closest to the bipolar plate outlet 102 is maintained at 40%, although they are located in the same column as the $16^{th}$ region R16. However, the contact angle θ increases up to 150%. Accordingly, the width W and the contact angle θ of the $56^{th}$ channel elements C56 in the $56^{th}$ region R56 closest to the bipolar plate outlet 102 are minimized.

As described above, the width W and the contact angle θ which are design parameters of the channel elements 10 are changed independently of each other according to the position.

Decreasing the width W is to increase the velocity of flow, and increasing the contact angle θ is to increase the concentration of the reaction gas contacting the surface of the base 110, which is the reaction surface. Thus, by changing the width W and the contact angle θ independently of each other according to the position, both an increase in the velocity of flow and an increase in reaction efficiency can be secured.

When both the width W and the contact angle θ are not changed, the velocity of flow of the fluid decreases toward the right direction along the width direction X of the channel flow path 10a from the left columns R11 to R51 closest to the bipolar plate inlet 101, and the concentration of the reaction gas decreases toward the rows R51 to R56 arranged farthest from the rows R11 to R16 closest to the bipolar plate inlet 101. Thus, the channel elements 10 located in the same column maintain the same width W, but only change the contact angle θ, and the channel elements 10 located in the same row maintain the same contact angle θ, but only change the width W so that both an increase in the velocity of flow and an increase in reaction efficiency can be secured.

On the other hand, in the present embodiment, the case where, among the plurality of channel elements 10, the channel elements 10 that are included in the same region R and adjacent to one another have the same width W and the same contact angle θ, will be described as an example. However, the present invention is not limited thereto, and it is also possible that all of the plurality of channel elements 10 have different widths W and different contact angles θ. That is, when the width W is gradually smaller and the contact angle θ is gradually increased as they are located in an area close to the bipolar plate outlet 102, it is also possible that the width W and the contact angle θ are changed differently even in the same region R.

The operation of the bipolar plate according to an embodiment of the present invention configured as described above will be described as follows.

The fluid introduced through the bipolar plate inlet 101 passes through the plurality of channel elements 10 and is then discharged to the outside through the bipolar plate outlet 102.

Since the width W of the channel elements 10 decreases from an area close to the bipolar plate inlet 101 to an area close to the bipolar plate outlet 102, the cross-sectional area of the channel elements 10 decreases, and the velocity of flow relative to the same flow rate increases.

Since the velocity of flow of the fluid increases toward the bipolar plate outlet 102, discharge of water generated by condensation on the downstream side of the bipolar plate 100 may be more smoothly performed. Thus, a flooding phenomenon may be prevented at the outlet side of the bipolar plate 100.

In addition, since the contact angle θ of the channel elements 10 increases from an area close to the bipolar plate inlet 101 to an area close to the bipolar plate outlet 102, the fluid flowing into the channel flow path 10a through the channel inlet 10b of the channel element 10 is concentrated and flows in the direction toward the surface of the base 110. That is, when the contact angle θ is increased, since the fluid flows in a direction close to a direction perpendicular to the surface of the base 110, fluid diffusion to the base 110 can be enhanced.

Figure 7A:
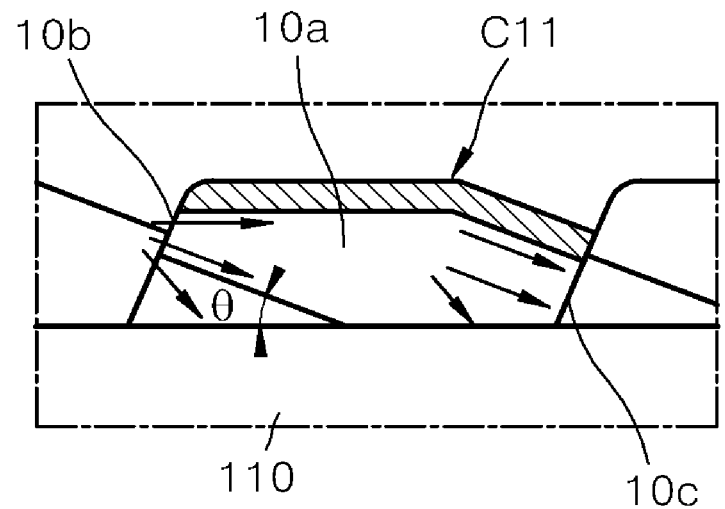
FIGS. 7A and 7B schematically illustrate the flow directions of a fluid depending on a contact angle of channel elements according to an embodiment of the present invention.
Figure 7B:
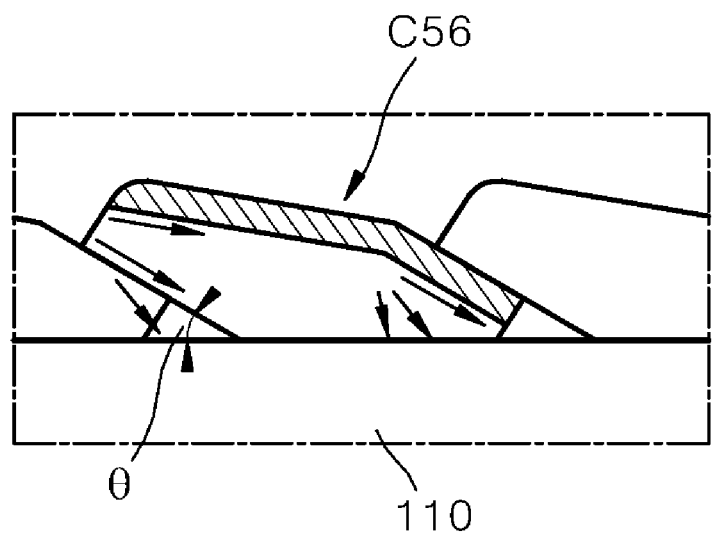

FIG. 7A shows the flow of the fluid when the contact angle θ of the channel elements 10 belonging to the $11^{th}$ region R11 close to the bipolar plate inlet 101 is 100%, and FIG. 7B shows the flow of the fluid when the contact angle θ of the channel elements 10 belonging to the $56^{th}$ region R56 close to the bipolar plate outlet 102 is increased to 150%.

Comparing FIGS. 7A and 7B, when the contact angle θ is increased from 100% to 150%, the flow angle of the fluid is also increased and more concentrated to the surface of the base 110.

The performance may be reduced due to a decrease in the concentration of the reaction gas toward the outlet side of the bipolar plate 100, but the diffusion of the reaction gas to the base 110 can be enhanced by increasing the contact angle θ.

Thus, a decrease in performance due to a decrease in the concentration of the reaction gas at the outlet side of the bipolar plate 100 can be prevented.

As described above, in the present invention, considering the flow characteristics of the fluid that varies depending on the region of the bipolar plate 100, the design parameters of the plurality of channel elements 10 can be appropriately changed so that the reaction effect in all areas of the bipolar plate 100 can be enhanced to ensure performance.

As described above, according to the present invention, a plurality of channel elements provided in a bipolar plate have different widths depending on positions, so that the velocity of flow of the fluid increases from the inlet toward the outlet of the bipolar plate and water generated when the fluid is condensed on the downstream side of the bipolar plate can be discharged more smoothly.

In addition, a plurality of channel elements have different contact angles depending on positions of the plurality of channel elements so that the contact angle increases toward the outlet side of the bipolar plate. Thus, the reaction gas can be more concentrated on the surface of a gas diffusion layer. Even if the concentration of the reaction gas is reduced at the outlet side of the bipolar plate, the diffusion of the reaction gas is well performed, so that performance reduction can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, the bipolar plate comprising:
   a base; and
   a plurality of channel elements that protrude from a surface of the base to be inclined at a certain contact angle, each channel element comprising a channel inlet, a channel flow path, and a channel outlet, wherein the channel inlet and the channel outlet are opened so that the fluid passes through the channel inlet, the channel flow path, and the channel outlet,
   wherein, among the plurality of channel elements, the channel elements arranged in an area close to the bipolar plate outlet have a smaller cross-sectional area than the channel elements arranged in an area close to the bipolar plate inlet, and the contact angle is formed large,
   wherein the channel elements are arranged in such a way that at least a portion of the channel outlet of one of the channel elements and the channel inlet of the other channel element of two channel elements adjacent in a longitudinal direction of the channel flow path directly overlap each other.

2. The bipolar plate of claim 1, wherein, in the plurality of channel elements, lengths of channel flow paths are same, and widths of the channel flow paths are smaller as they are arranged in an area close to the bipolar plate outlet.

3. The bipolar plate of claim 1, wherein the plurality of channel elements have different cross-sectional areas, and the cross-sectional areas are gradually smaller as they are arranged in an area close to the bipolar plate outlet.

4. The bipolar plate of claim 1, wherein the plurality of channel elements have different contact angles, and the contact angles are gradually increased as they are arranged in an area close to the bipolar plate outlet.

5. The bipolar plate of claim 1, wherein, in the plurality of channel elements, a portion of the channel elements adjacent in a width direction of the channel elements have a same cross-sectional area.

6. The bipolar plate of claim 1, wherein, in the plurality of channel elements, a portion of the channel elements adjacent in a longitudinal direction of the channel elements have a same contact angle.

7. The bipolar plate of claim 1, wherein the bipolar plate inlet and the bipolar plate outlet are apart from each other in a diagonal direction, and among the plurality of channel elements, channel elements apart from each other in a width direction of the channel flow path have a smaller cross-sectional area as they go toward a direction to the bipolar plate outlet, and the contact angle thereof is formed identically.

8. The bipolar plate of claim 1, wherein the bipolar plate inlet and the bipolar plate outlet are apart from each other in a diagonal direction, and among the plurality of channel elements, channel elements apart from each other in a longitudinal direction of the channel flow path have a same cross-sectional area as they go toward a direction to the bipolar plate outlet, and the contact angle thereof is increased.

9. The bipolar plate of claim 1, wherein the base comprises a gas diffusion layer.

10. A bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, wherein the bipolar plate inlet and the bipolar plate outlet are apart from each other in a diagonal direction, the bipolar plate comprising:
   a base: and
   a plurality of channel elements arranged in a form of a matrix to be apart from each other by a certain distance on a surface of the base, wherein each of the plurality of channel elements protrudes from the surface of the base to be inclined at a certain contact angle, each channel element comprising a channel inlet, a channel flow path, and a channel outlet, wherein the channel inlet and the channel outlet are opened so that the fluid passes through the channel inlet, the channel flow path, and the channel outlet,
   wherein, among the plurality of channel elements, the channel elements arranged in an area close to the bipolar plate outlet have a smaller cross-sectional area than the channel elements arranged in an area close to the bipolar plate inlet, and the contact angle is formed large, and the plurality of channel elements have a same length, and among the plurality of channel elements, the channel elements apart from each other in a width direction of the channel flow path and arranged in a same row have the width decreasing as they go toward a direction to the bipolar plate outlet, and the contact angle thereof is formed identically, and among the plurality of channel elements, the channel elements apart from each other in a longitudinal direction of the channel flow path and arranged in a same column have a same width as they go toward a direction to the bipolar plate outlet, and the contact angle thereof is formed to increase,
   wherein the channel elements are arranged in such a way that at least a portion of the channel outlet of one of the channel elements and the channel inlet of the other channel element of two channel elements adjacent in a longitudinal direction of the channel flow path directly overlap each other.

11. The bipolar plate of claim 10, wherein the plurality of channel elements have different widths, and the widths are gradually smaller as they are arranged in an area close to the bipolar plate outlet.

12. The bipolar plate of claim 10, wherein the plurality of channel elements have different contact angles, and the contact angles are gradually larger as they are arranged in an area close to the bipolar plate outlet.

13. A bipolar plate of a polymer electrolyte membrane fuel cell, in which a bipolar plate inlet into which a reaction gas is introduced from an outside and a bipolar plate outlet through which a fluid including the reaction gas remaining after reacting inside or a product generated after reaction is discharged to the outside, are formed, wherein the bipolar plate inlet and the bipolar plate outlet are apart from each other in a diagonal direction, the bipolar plate comprising:
   a base: and
   a plurality of channel elements arranged in a form of a matrix to be apart from each other on a surface of the base, wherein each of the plurality of channel elements protrudes from the surface of the base to be inclined at a certain contact angle, each channel element comprising a channel inlet, a channel flow path, and a channel outlet, wherein the channel inlet and the channel outlet are opened so that the fluid passes through the channel inlet, the channel flow path, and the channel outlet,
   wherein, among the plurality of channel elements, the channel elements arranged in an area close to the bipolar plate outlet have a smaller cross-sectional area than the channel elements arranged in an area close to the bipolar plate inlet, and the contact angle is formed large, and the width and the contact angle change independently of each other, the plurality of channel elements have a same length, and among the plurality of channel elements, a portion of the channel elements adjacent in a width direction of the channel element have a same cross-sectional area, and a portion of the channel elements adjacent in a longitudinal direction of the channel element have a same contact angle,
   wherein the channel elements are arranged in such a way that at least a portion of the channel outlet of one of the channel elements and the channel inlet of the other channel element of two channel elements adjacent in a longitudinal direction of the channel flow path directly overlap each other.

* * * * *